United States Patent [19]

Marze et al.

[11] 4,319,008
[45] Mar. 9, 1982

[54] POLYETHER ADMIXTURE AND SEMI-PERMEABLE MEMBRANES COMPRISED THEREOF

[75] Inventors: Xavier Marze, Lyons; Michel Minfray, Oullins, both of France

[73] Assignee: Rhone-Poulenc Industries, Paris, France

[21] Appl. No.: 35,480

[22] Filed: May 3, 1979

[30] Foreign Application Priority Data

May 3, 1978 [FR] France ................................ 78 13777

[51] Int. Cl.³ ........................ C08L 71/00; C08L 81/06
[52] U.S. Cl. ................................ 525/523; 210/500.2; 525/535; 525/930
[58] Field of Search .................. 525/523, 930, 535; 210/500 M, 500.2

[56] References Cited

U.S. PATENT DOCUMENTS

| | | | |
|---|---|---|---|
| 3,375,297 | 3/1968 | Barth et al. | 525/523 |
| 3,530,087 | 9/1970 | Hayes et al. | 525/523 |
| 3,709,841 | 1/1973 | Quentin | 210/500 M |
| 3,819,472 | 6/1974 | Vasta | 525/523 |
| 4,087,391 | 5/1978 | Quentin | 210/500 M |
| 4,118,439 | 10/1978 | Marze | 525/930 |
| 4,200,726 | 4/1980 | Ishii et al. | 210/500.2 |
| 4,207,182 | 6/1980 | Marze | 210/500.2 |
| 4,208,508 | 6/1980 | Hashino et al. | 210/500.2 |

Primary Examiner—Wilbert J. Briggs, Sr.
Attorney, Agent, or Firm—Burns, Doane, Swecker & Mathis

[57] ABSTRACT

Semi-permeable, e.g., ultrafiltration membranes are shaped from a solvent solution of an admixture of at least one polyether comprising recurring units of the structural formula:

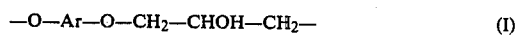

$$-O-Ar-O-CH_2-CHOH-CH_2- \quad (I)$$

and at least one polyether comprising recurring units of the structural formula:

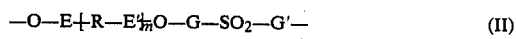

$$-O-E+R-E'\!\!\!\!-_m\!O-G-SO_2-G'- \quad (II)$$

wherein Ar, E, E', G and G' are divalent aromatic radicals, m is an integer, and R is a valence bond or a member selected from the group comprising —CO—, —O—, —SO$_2$— and a divalent hydrocarbon.

29 Claims, No Drawings

POLYETHER ADMIXTURE AND SEMI-PERMEABLE MEMBRANES COMPRISED THEREOF

BACKGROUND OF THE INVENTION

1. Field of the Invention

The present invention relates to novel semi-permeable membranes, and, more especially, to semi-permeable membranes useful for ultrafiltration techniques. The invention also relates to a process for the fabrication of such membranes.

2. Description of the Prior Art

It is well known to this art to utilize semi-permeable membranes in various separation processes, such as reverse osmosis and ultrafiltration.

For such applications, it is advantageous to fabricate screen-based or reinforced membranes, namely, membranes which comprise, for at least a portion of their thickness, a flexible support or backing [which is frequently a fabric, non-woven or grid], which support renders the membranes both strong and easy to handle, even when in the form of samples having large dimensions. Screen-based membranes are generally produced by casting a polymer solution, followed by removal of the solvent [notably by evaporation and/or coagulation]. The polymer solution is hereafter referred to as the "collodion", regardless of the polymer envisaged. If the collodions used are too dilute, it is difficult to obtain a uniform coating; if the thickness of the cast collodion is large, the collodion tends to spread and overflow, and this leads to a nonuniform thickness, whereas, if the thickness of the cast collodion is small, there is a risk of not covering the screen completely. Furthermore, in terms of the coagulation following the casting of the collodion, the inevitable ripples which occur on the surface of the coagulating bath form surface irregularities [wrinkling] on the membrane; too, the polymer [as a dilute collodion] coagulates incompletely and elements become detached therefrom and denature the coagulating liquid by forming suspensions thereof.

It is therefore of the greatest value, industrially, to be able to make use of fairly concentrated polymer solutions.

For the production of semi-permeable membranes, a very large number of known polymers have been tested or utilized. Polymers based on polysulfone derivatives are of value essentially because of their properties of enhanced chemical stability which are inherent by reason of the very nature of polysulfones, and independently of the fact that same have been shaped as a membrane.

Thus, French Certificate of Addition No. 2,005,334 has described polysulfone membranes which are themselves known, as per French Pat. No. 1,584,659. These membranes are fabricated from a collodion containing from 8 to 20% of polymer. If it is desired to produce polysulfone membranes from more concentrated solutions [for example, of at least 25% strength, so as to give a viscosity greater than at least 15 Poises], it is no longer possible to obtain membranes which can be used in ultrafiltration.

SUMMARY OF THE INVENTION

Thus, the present invention features novel semi-permeable membranes which can be widely used in industry, in particular for purposes of ultrafiltration, and which are based on a polymeric composition of polysulfone type but which can be fabricated from fairly concentrated collodions.

The membranes according to the invention are characterized in that they comprise a mixture including at least one polymer (polyether) comprising recurring units of the structural formula (I):

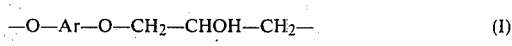

and at least one polymer (polyether) comprising recurring units of the structural formula (II):

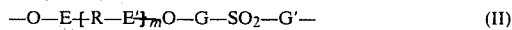

in which formulae: Ar is a divalent aromatic radical in which the free valencies depend from nuclear carbons, i.e., carbon atoms defining aromatic nuclei; Ar typically has the formula $-C_6H_4-R-C_6H_4-$; m is an integer which is typically equal to 0, 1 or 2 and is preferably equal to 1; E, E', G and G' are divalent aromatic radicals, E and E' being optionally sulfonated [same are preferably phenylene radicals, in particular paraphenylene radicals, which are optionally sulfonated in the case of E and E']; and R represents a valence bond, or a radical selected from the group comprising —CO—, —O—, —SO$_2$— and the divalent hydrocarbon radicals, such as alkylene, alkylidene and cycloalkylene radicals [such radicals preferably having less than 7 carbon atoms].

The radicals E and E' can therefore be sulfonated, namely, same can bear sulfonic groups.

The term sulfonic group should be understood as denoting a group —SO$_3$H or the salt forms thereof, such as, for example, the groups $-SO_3^{\ominus}.(1/n)M^{n\oplus}$, in which M represents the hydrogen ion or an ion NH$_4^\oplus$ or an alkali metal or alklaline earth metal ion (of valency n), n being an integer equal to 1 or 2.

Preferably, the polyether comprising recurring units of the structural formula (I) essentially wholly consists of recurring units of the structural formula (I) and, similarly, the polyether comprising recurring units of the structural formula (II) essentially wholly consists of such recurring units of said structural formula (II).

DETAILED DESCRIPTION OF THE INVENTION

According to a preferred embodiment of the invention, the mixture of the two polyethers of the structural formulae (I) and (II) contains 15% (by weight) to 85% (by weight) of the polyether comprising recurring units of the structural formula (II) and, more preferably, from 30 to 75% by weight of such polyether.

The polyethers comprising recurring units of the formulae (I) and (II) typically have a weight average molecular weight between 10,000 and 60,000 and, preferably, between 20,000 and 50,000.

The amount of sulfonic groups in the polyether comprising recurring units of the structural formula (II) is advantageously less than 1,500 milliequivalents/kg [milliequivalents per kilogram of sulfonated polysulfone] and preferably less than 1,000 milliequivalents/kg. However, those compositions according to the invention which do not contain any units bearing sulfonic substituents are preferred.

The polymeric compositions which make it possible to fabricate membranes, according to the invention, can, in particular, be in the form of solutions or solids, it being possible for this solid to be shaped [for example, as membranes] or unshaped [for example, as powders].

The solutions of polymeric compositions are advantageously solutions in aprotic polar solvents which are preferably selected such that they dissolve each polyether individually and such that the dissolution of the polyether mixtures is accompanied by the minimum demixing (separation into two distinct liquid phases); these solutions characteristically are of a concentration which is below saturation and generally above 20% by weight and preferably above 22%. The term "dissolution accompanied by the minimum demixing" is intended to connote that no demixing or separation takes place when the solution in question is left to stand for one or preferably up to 12 hours. The preferred solvents and solutions are those which do not give rise to any demixing. However, demixing is not considered to have taken place if the particular solution of the polymeric mixture according to the invention simply exhibits turbidity, a lack of limpidity or opalescence. The upper limit on the concentration of the solutions of the polymeric mixtures according to the invention is not critical, but solutions having a concentration of less than 30% are generally preferred. These solutions can contain several solvents or even non-solvents, such as acetone or dioxane, or also salts, such as the alkali metal or alkaline earth metal acid salts derived from strong mineral acids or from carboxylic or organic sulfonic acids. The proportion of these additives is preferably less than 2%.

These solutions are very particularly advantageous if the solvent is N-methylpyrrolidone because same permit high polyether contents without giving rise to demixing. Dimethylacetamide can also be used.

The solutions of polymeric compositions as defined above can contain between 0.05 and 2% (by weight) of water and preferably between 0.1 and 1% (by weight); the presence of small amounts of water frequently has a beneficial effect on the permeability of the membranes and/or the reproducibility of the processes. The addition of water to the solutions sometimes adversely affects the limpidity thereof.

This invention also features a process for the preparation of semi-permeable membranes. The polymeric compositions for the preparation of the membranes according to the invention are typically obtained by mixing the individual polymers in the solid state, in the form of particles (for example, grains or powders), and/or in the form of solutions; the solutions are those defined above.

Solutions of the subject polymeric compositions can be obtained in fairly diverse ways, and, in particular, by the following processes:

[i] two separate solutions of each polyether can be mixed [this being the preferred process leading to the best membranes];

[ii] one polyether in the solid state in the form of particles (for example, grains or powders) can be mixed with a solution of the other polyether [and vice versa];

[iii] both polyethers can be mixed in the solid state in the form of particles (for example, grains or powders), and this mixture of particles can thence be dissolved in suitable solvent; or

[iv] both polyethers can be dissolved at the same time by simultaneously adding them to one and the same solvent.

Therefore, the polymeric compositions which enable fabrication of the membranes according to the invention are essentially or mainly homogeneous, particularly in the solid state, namely, by simple means, it is not possible to distinguish the constituents of the mixture from one another; the term "simple means" should be understood as meaning mechanical or optical means, observation with the naked eye being the preferred means. Nevertheless, it is possible that the homogeneous compositions are not always limpid; for example, they can be opalescent or exhibit turbidity.

However, these compositions can be semi-homogeneous; the term "semi-homogeneous compositions" connotes, in particular, compositions obtained by the simple mixing of the constituents in the form of powder.

The semi-permeable membranes [which are more particularly intended for ultrafiltration] based on polymeric compositions according to the invention can be of various types. Same can be asymmetric membranes [which are also referred to as anisotropic membranes] or composite membranes, either of which are optionally screen based.

Asymmetric membranes possess (a) a layer [or, rather, a zone] having pores of small diameter, this layer acting as a semi-permeable membrane, and (b) a porous layer [or, rather, a porous zone] having pores of greater diameter than those in the preceding layer, this second layer acting as a reinforcing support and having the same chemical nature as the layer (a). Asymmetric membranes are known; the layer (b) generally allows solutions to permeate freely thereacross; the layer (a) has pores which are such that the cut-off zone is generally between 1,000 and 100,000; more generally, the size of the pores can vary continuously from one face surface to the other of asymmetric membranes.

Composite membranes are distinguished from asymmetric membranes by the fact that the two layers (a) and (b) have a different chemical nature; same typically consist of a fine permeable layer (0.1 to 10$\mu$) of polymer, deposited on a porous support [which can be an ultrafiltering membrane with larger pores].

These membranes can therefore be screen based, the screen constituting 20 to 80% by weight of the screen+polyether combination. A screen is a reinforcing support, for example, a fabric, a non-woven, a paper, a grid or netting.

Asymmetric membranes can be prepared by casting a solution of the mixture of polymers according to the invention [preferably in N-methylpyrrolidone] onto a leak-tight support, and then coagulating one of the faces of the liquid film by means of a non-solvent for the polymeric compositions.

According to a preferred process for the preparation of ultrafiltration membranes according to the invention, a solution of the mixture of polymers per the invention is cast onto a (leak-tight) support, and the liquid film on its support is then immersed (or dipped) in a coagulating bath, namely, a liquid which is a non-solvent for the polyethers used. The leak-tight support has the desired shape (planar, moving strip, cone, tube or the like); it can be made of any material providing a smooth surface, in particular, glass or metal (preferably non-oxidizable) or of an inert polymer such as polytetrafluoroethylene. The liquid constituting the coagulating bath is preferably miscible with the solvent for the polyethers [which solvent is used for dissolution of the compositions of the invention].

Advantageously, when m is equal to 1 or 2 in the structural formula (II), the coagulating bath is pure water, but it is also possible to use methanol, water/methanol mixtures or aqueous solutions containing [preferably in amounts of less than 10% by weight] additives such as organic solvents or salts or surface-active agents or weak acids.

When m is equal to 0, the coagulating bath can be methanol.

The temperature of the coagulating bath can be between +1 and 60° C. and preferably between 15° and 50° C.

The coagulation can be preceded by partial evaporation of the solvent from the liquid film, and this can modify the permeability properties of the resultant membranes. The coagulation can also be followed by an aqueous heat treatment [by immersion in a hot water bath], and this makes it possible both to complete the removal of organic solvent and to cause relaxation [release of the internal stresses].

The semi-permeable membranes according to the invention are especially advantageous in the composite or asymmetric form and when same are used in ultrafiltration. More specifically, these membranes are very particularly suitable for the ultrafiltration of aqueous or organic solutions and/or suspensions. Examples of such solutions or suspensions which may be mentioned are: dairy products, milk or whey, and edible or recovered oils; biological liquids, in particular blood plasma, blood, haemodialysis baths, microbiological suspensions and suspensions or solutions of enzymes; the reaction media from biological reactors and enzymatic reactors; and effluents, in particular those of municipal or industrial origin, for example, the effluents produced by plants for the manufacture of paper pulp and by tanning factories (liming baths).

Of course, the membranes according to the invention are also especially advantageous because of their good resistance both to acid or basic chemical agents and to heat.

In order to further illustrate the present invention and the advantages thereof, the following specific examples are given, it being understood that same are intended only as illustrative and in nowise limitative.

EXAMPLE 1

A mixture of 222 g of N-methylpyrrolidone (NMP), 3 g of water and 22.5 g of a polyether comprising recurring units of the structural formula:

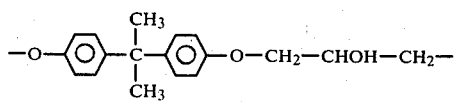
(III)

and having a weight average molecular weight of 30,000 was introduced into a reactor.

The mixture was stirred at ambient temperature for 30 minutes and 52.5 g of a polyether comprising recurring units of the structural formula:

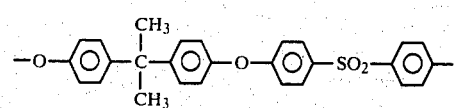
(IV)

and having a weight average molecular weight of 35,000 (measurement by means of light scattering) were than added.

The mixture was stirred for an additional 30 minutes at ambient temperature and then for 3 hours at 50° C., and was subsequently filtered at ambient temperature.

The solution thus obtained has a polymer concentration of 25% by weight and a viscosity of 42 Poises, and the percentage by weight of the polyether comprising recurring units of the structural formula (IV) was 70%, relative to the total weight of both polyethers.

This solution was cast onto a glass plate (to a thickness of about 250μ) and was coagulated by immersion in a water bath, at 40° C., containing 1 part per 10,000 of surface-active agent (polyoxyethyleneated tert.-butylphenol marketed under the name Triton X-100). The resulting membrane had a thickness of about 100μ.

Such a membrane provided a flow rate of pure water of 35,400 liters/day/m$^2$ under a differential pressure of 2 bars. The differential pressure is the pressure difference prevailing between one side of the membrane and the other.

EXAMPLES 1a and 1b [Comparative Examples]

Example 1 was repeated, but either the polyether comprising recurring units of the structural formula (III) was used by itself (Example 1a) or the polyether comprising recurring units of the structural formula (IV) was used by itself (Example 1b), the concentration by weight of polymer in the casting solution remaining the same.

The casting solution had a viscosity of 53.9 Poises for Example 1b and 23.9 Poises for Example 1a. In both cases, the resulting membranes provided a water flow rate of zero under a pressure of 2 bars.

EXAMPLES 2 to 7

Example 1 was repeated, the percentage by weight of the polyether comprising recurring units of the structural formula (IV) being varied relative to the total weight of both polyethers, and the overall concentration of the casting solution remaining the same.

The following results were obtained:

| EXAMPLE | Percentage of the polyether comprising recurring units of the structural formula (IV) | Viscosity, in Poises, of the casting solution | Flow rate of pure water, in liters/day/m$^2$ provided by the resulting membrane under a pressure of 2 bars |
|---|---|---|---|
| 2 | 75 | 44 | 3,900 |
| 3 | 65 | 41.4 | 36,000 |
| 4 | 60 | 40.5 | 32,700 |
| 5 | 50 | 37.2 | 27,000 |
| 6 | 45 | 37 | 25,670 |
| 7 | 40 | 35.4 | 12,330 |

EXAMPLE 8

Example 1 was repeated, the water being omitted from the casting solution and replaced by 3 g of N-methylpyrrolidone.

The casting solution had a viscosity of 36.6 Poises.

The resulting membrane had a permeability to pure water of 21,900 liters/day/m$^2$ under a pressure of 2 bars.

EXAMPLE 9

Example 1 was repeated but the concentration of polymer in the casting solution was 24% instead of 25%.

The casting solution had a viscosity of 33 Poises and the resulting membrane had a permeability to pure water of 42,200 liters/day/m² under a pressure of 2 bars.

EXAMPLE 10

Example 3 was repeated, but the concentration of polymer in the casting solution was 27% instead of 25%.

The casting solution had a viscosity of 70 Poises. The resulting membrane had a permeability to pure water of 31,900 liters/day/m² under a pressure of 2 bars.

EXAMPLES 11 and 12

Example 1 was repeated, but the temperature of the coagulating bath was modified.

The following results were obtained:

| EXAMPLE | Temperature of the coagulating bath in °C. | Permeability to pure water of the resulting membrane under a pressure of 2 bars |
|---|---|---|
| 11 | 30 | 21,100 |
| 12 | 20 | 11,600 |

EXAMPLE 13

A mixture of 213 g of NMP, 3 g of water, 29.4 g of the polyether comprising recurring units of the structural formula (III), used in Example 1, and 54.6 g of the polyether comprising recurring units of the structural formula (IV), used in Example 1, was introduced into a reactor.

The mixture was heated for 4 hours at 50° C., under stirring. This provided a limpid solution having a viscosity of 97.5 Poises and a polymer concentration of 28%.

This solution was cast onto a glass plate to a thickness of about 0.2 mm and was coagulated by immersion in a water bath, at 40° C., containing 1 part per 10,000 of surface-active agent (Triton X-100).

The resulting membrane provided a flow rate of pure water of 17,700 liters/day/m² under a differential pressure of 2 bars.

With respect to dextran T-500 (polysaccharide having an average molecular weight of 500,000), used in an aqueous solution containing 4 g of dextran T-500 per liter of water, this membrane, used as above, displayed a rejection level of 46%.

$$\left( \text{Rejection level} = \frac{\text{concentration of the initial solution} - \text{concentration of the ultrafiltrate}}{\text{concentration of the initial solution}} \times 100 \right)$$

EXAMPLE 14

Two 600 g solutions were each prepared from 450 g of NMP and 150 g of polyether.

For one of the solutions, the polyether was the polyether comprising recurring units of the structural formula (III), used in Example 1. For the other solution, the polyether was characterized by recurring units of the structural formula:

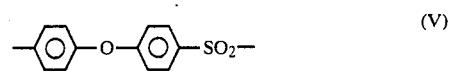   (V)

and a weight average molecular weight of about 39,000.

These two solutions were mixed and same formed a limpid solution having a viscosity of 35.5 Poises and a polymer concentration of 30%.

This solution was cast onto a glass plate and coagulated in a methanol bath at about 21° C.

The resulting membrane had a thickness of 100μ and provided a flow rate of pure water of 2,700 liters/day/m² under a pressure of 2 bars.

EXAMPLE 15

A first solution was prepared from 37.5 g of the polyether comprising recurring units of the structural formula (III), used in Example 1, and 112.5 g of NMP.

A second solution was prepared from 100 g of a sulfonated polyaryl-ether-sulfone (obtained by sulfonation of a polyether comprising recurring units of the structural formula IV; content of sulfonic acid groups=970 milliequivalents/kg; these groups are in the form of sodium salts), 292 g of NMP, 4 g of water and 4 g of lactic acid.

The entire mass of the first solution was mixed with 150 g of the second solution and this produced a solution having a viscosity of 16 Poises and a polyether concentration of 25%.

This solution was cast onto a glass plate (thickness of the liquid film: about 0.3 mm) and coagulated by immersion in water, at 40° C., containing 1 part per 10,000 of Triton X-100.

The resulting membrane provided a flow rate of pure water of 18,000 liters/day/m² under a pressure of 2 bars.

EXAMPLE 16

195 g of a first solution were prepared from 48.75 g of the polyether comprising recurring units of the structural formula (IV), used in Example 1, and 146.25 g of NMP.

105 g of a second solution were prepared from 26.25 g of the polyether comprising recurring units of the formula (III), used in Example 1, and 78.75 g of NMP.

These two solutions were mixed and such admixture afforded a limpid solution having a viscosity of 36 Poises and a polymer concentration of 25%.

This solution was cast onto a glass plate and coagulated by immersion in methanol at about 21° C.

The resulting membrane had a thickness of 40μ and provided a flow rate of pure water of 15,000 liters/day/m² under a pressure of 2 bars.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A semi-permeable membrane comprising a composition of matter comprising an admixture of at least one polyether consisting essentially of recurring units of the structural formula:

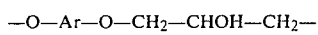   (I)

and at least one polyether consisting essentially of recurring units of the structural formula:

$$-O-E+R-E'\}_m-O-G-SO_2-G'- \qquad (II)$$

in which formulae Ar is a divalent aromatic radical in which the free valencies are borne by nuclear carbons; m is a lower integer; E, E', G and G' are divalent aromatic radicals, and R is a valence bond or a radical selected from the group consisting of —CO—, —O—, —SO$_2$— and divalent hydrocarbon radicals.

2. A semi-permeable membrane in accordance with claim 1 comprising a composition of matter wherein Ar has the structural formula: —C$_6$H$_4$+ R—C$_6$H$_4$]$_{\overline{m}}$; m is 0, 1 or 2; and R is selected from the group consisting of lower alkylene, lower alkylidene and lower cycloalkylene.

3. A semi-permeable membrane in accordance with claim 2 comprising a composition of matter wherein either or both of E and E' are sulfonated.

4. A semi-permeable membrane in accordance with claim 3 comprising a composition of matter wherein either or both of E and E' comprise substituents having the structural formula: —SO$_3\ominus$.(1M$^{n\oplus}$/n), wherein M is hydrogen, NH$_4\oplus$ or an alkali or alkaline earth metal of valency n, and n is 1 or 2.

5. A semi-permeable membrane in accordance with claim 2, 3 or 4 comprising a composition of matter wherein E, E', G and G' are phenylene radicals.

6. A semi-permeable membrane in accordance with claim 4 or 1 comprising a composition of matter containing from 15 to 85% by weight of a polyether comprising recurring units of the structural formula (II).

7. A semi-permeable membrane in accordance with claim 6 comprising a composition of matter containing from 30 to 75% by weight of a polyether comprising recurring units of the structural formula (II).

8. A semi-permeable membrane in accordance with claim 2, 4 or 1 comprising a composition of matter wherein each polyether has a weight average molecular weight of between 10,000 and 60,000.

9. A semi-permeable membrane in accordance with claim 8 comprising a composition of matter wherein each polyether has a weight average molecular weight of between 20,000 and 50,000.

10. A semi-permeable membrane in accordance with claim 4 comprising a composition of matter wherein the content of the sulfonic substituents in the polyether (II) is less than 1,500 milliequivalents/kg.

11. A semi-permeable membrane in accordance with claim 10 comprising a composition of matter wherein the content of the sulfonic substituents is less than 1,000 milliequivalents/kg.

12. A semi-permeable membrane in accordance with claim 2 or 1 comprising a composition of matter wherein each polyether consists essentially of its respective recurring units (I) and (II).

13. A semi-permeable membrane as defined by claim 1, the same being an asymmetric membrane.

14. A process for the fabrication of a semi-permeable membrane, comprising casting onto a support a solvent solution of a composition of matter comprising an admixture of at least one polyether consisting essentially of recurring units of the structural formula:

$$-O-Ar-O-CH_2-CHOH-CH_2- \qquad (I)$$

and at least one polyether consisting essentially of the structural formula:

$$-O-E+R-E']_{\overline{m}}O-G-SO_2-G'- \qquad (II)$$

in which formulae Ar is a divalent aromatic radical in which the free valencies are borne by nuclear carbons; m is a lower integer; E, E', G and G' are divalent aromatic radicals, and R is a valence bond or a radical selected from the group consisting of —CO—, —O—, —SO$_2$— and divalent hydrocarbon radicals, and thence coagulating same into membrane form.

15. The process as defined by claim 14 wherein said solvent solution comprises a composition of matter wherein Ar has the structural formula: —C$_6$H$_4$+R—C$_6$H$_4$]$_{\overline{m}}$; m is 0, 1 or 2; and is selected from the group consisting of lower alkylene, lower alkylidene and lower cycloalkylene.

16. The process as defined by claim 15 wherein said solvent solution comprises a composition of matter wherein either or both of E and E' are sulfonated.

17. The process as defined by claim 16 wherein said solvent solution comprises a composition of matter wherein either or both of E and E' comprise substituents having the structural formula: —SO$_3\ominus$.(1M$^{n\oplus}$/n), wherein M is hydrogen, NH$_4\oplus$ or an alkali or alkaline earth metal of valency n, and n is 1 or 2.

18. The process as defined by claim 14, further comprising subjecting the resultant membrane to an aqueous heat treatment.

19. The process as defined by claim 14, the coagulating being by means of water at a temperature of between 1° and 60° C.

20. The process as defined by claim 19 wherein the temperature of the coagulating bath is between 15° and 50° C.

21. The process as defined by claim 14, 15, 16, or 17 wherein the concentration of the polyether admixture in the solvent solution is greater than 20% by weight.

22. The process as defined by claim 21 wherein said concentration is between about 22% and 30% by weight.

23. The process as defined by claim 21 wherein the solvent of said solvent solution comprises N-methylpyrrolidone.

24. The process as defined by claim 21 wherein the solution comprises from 0.05 to 2% by weight water.

25. The process as defined by claim 24 wherein the solution comprises from 0.1 to 1% by weight water.

26. The membrane obtained by the process of claim 21.

27. The membrane obtained by the process of claim 22.

28. The membrane obtained by the process of claim 23.

29. The membrane obtained by the process of claim 24.

* * * * *